INVENTOR.
L. J. BALL

BY *Young & Quigg*

ATTORNEYS

Sept. 23, 1969     L. J. BALL     3,468,409

PULLER

Filed Oct. 23, 1967     3 Sheets-Sheet 3

INVENTOR.
L. J. BALL

BY *Young & Quigg*

ATTORNEYS

United States Patent Office 3,468,409
Patented Sept. 23, 1969

3,468,409
PULLER
Lawrence J. Ball, Bartlesville, Okla., assignor to Phillips Petroleum Company, a corporation of Delaware
Filed Oct. 23, 1967, Ser. No. 677,252
Int. Cl. B65g 15/14
U.S. Cl. 198—165                3 Claims

ABSTRACT OF THE DISCLOSURE

In an apparatus for conveying structural forms, such as pipes, away from a source, such as an extruder, in which the apparatus comprises a lower conveying means, an upper conveying means superimposed over the lower conveying means and aligned in parallel relationship therewith, and a means to drive at least one of the conveying means to carry the structural forms away from the source, there is provided a planar substantially rigid support means for one of the conveying means, a planar support means for the other of the conveying means, and a means to apply pressure to the last mentioned planar support so that structural forms between the upper and lower conveying means have applied thereto continuous pressure along the length between the upper and lower conveying means. Additional means can be employed to prevent the rotation of the last mentioned planar support about a longitudinal axis.

---

In the extrusion of continuous structural forms, such as pipes, it is often desirable to withdraw the structural form from the conveyor at a given rate. The rate of withdrawal of the form from the extrusion machine oftentimes determines the thickness of a pipe, for example, or the particular shape of the finished extruded article. Thus, it is desirable or even necessary to withdraw the shape at a predetermined rate.

A commercial machine which is available for pulling structural shapes, such as pipes, from an extruder is disclosed in U.S. 3,170,564, Gatto, 1965. In this pulling machine, a pair of continuous conveyor belts, one superimposed on the other and aligned in parallel relationship with the other, position an extrudate therebetween and pull the extrudate from the extruder. The lower conveyor is supported by a spring loaded plate. The upper conveyor is supported along an intermediate portion by a plurality of rollers spring loaded by rotatable arms.

I have now discovered that an improvement can be made to the aforementioned machine if the support member for the upper conveyor belt comprises a spring-loaded elongated plate which applies uniform pressure along the length thereof. The spring loaded plate also contains a means to prevent rotation of the plate about a longitudinal axis. By this provision more uniform pressure on the extrudate is applied over a longer length than with the rollers. This increased uniform pressure increases the grip of the conveyor belts on the extrudate and increases the pulling ability of the machine. Further, the uniform pressure along the length of the belts minimizes slipping of the extrudate in the pulling machine. In addition, the support member for the lower conveyor belt is preferably rigidly mounted.

By various aspects of this invention one or more of the following, or other, objects can be obtained.

It is an object of this invention to provide an apparatus for withdrawing structural shapes from a source.

It is a further object of this invention to provide an apparatus for pulling shapes such as pipes from an extrusion machine whereby the slipping of the pipe in the pulling machine is minimized.

It is a further object of this invention to provide an apparatus for pulling structural shapes from an extrusion machine wherein a uniform pressure is applied to the extrudate and slipping of the extrudate in the pulling mechanism is minimized.

It is a further object of this invention to provide a machine for pulling shapes from an extrusion machine using two opposed conveyors in which the need to center the extrudate along the width of the conveyor is avoided.

Other aspects, objects, and the several advantages of this invention are apparent to one skilled in the art from a study of this disclosure, the drawings, and the appended claims.

According to the invention there is provided an apparatus for conveying a structural form away from a source, the apparatus having a lower conveyor means, an upper conveyor means superimposed over the lower conveyor means and aligned in parallel relationship with the lower conveyor means. There is further provided a means to drive at least one of the conveyor means to move the structural form away from the source. A planar substantially rigid support means is provided for one of the conveyor means. A vertically movable planar support is provided for the other of the conveyor means and there is further provided a means to apply pressure to the last mentioned planar support means so that the structural form between the upper and lower conveyor means has applied to it a continuous uniform pressure along the length thereof between the upper and lower means. There is still further provided a means to prevent axial rotation (along the line of movement of the shapes) of the last mentioned planar support means.

The invention will now be described with reference to the accompanying drawings in which FIGURE 1 is an axonometric view of an apparatus according to the invention;

Figure 1:
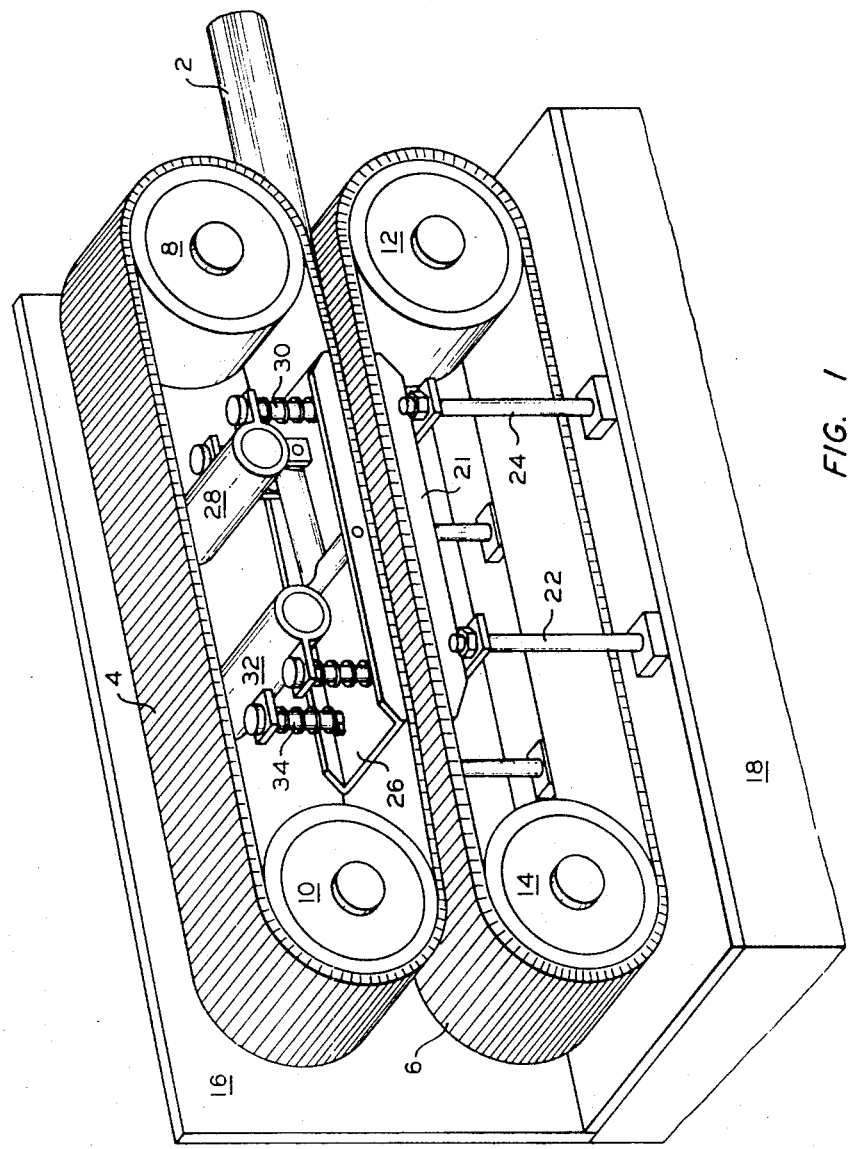
Figure 2:
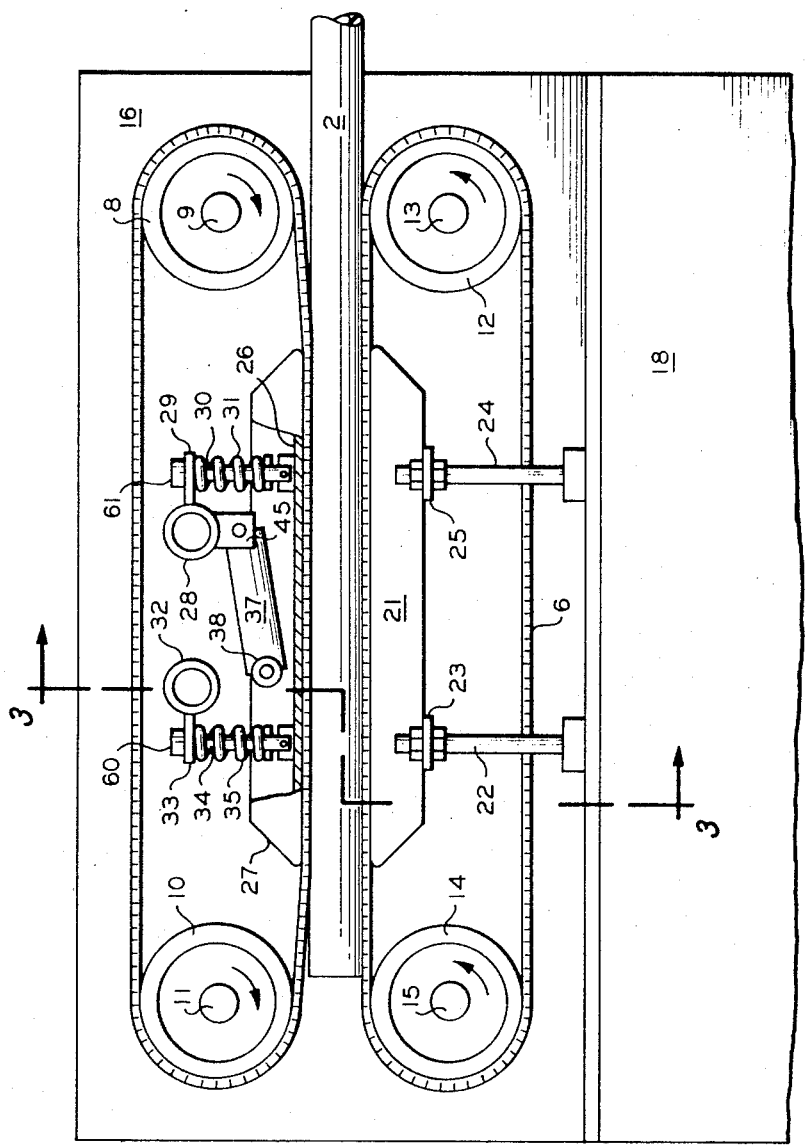
FIGURE 2 is a side elevational view of the apparatus shown in FIGURE 1.
Figure 3:
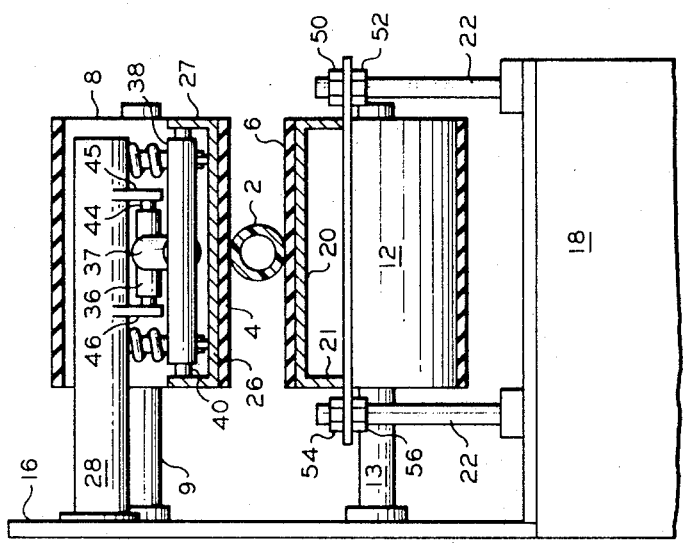
FIGURE 3 is a view along lines 3—3 of FIGURE 2.

Referring now to the drawings, a structural shape such as a pipe 2 is extruded from an extrusion machine (not shown) and passes in between continuous conveyor belts 4 and 6 which grip the pipe. The combination of endless conveyor belts 4 and 6 provides a constant pulling action on the pipe 2 in the process of removing the pipe from the extrusion machine. The conveyor belt 4 is supported by rotatable drums 8 and 10 and conveyor belt 6 is supported by rotatable drums 12 and 14. At least one of the drums 8, 10, 12 and 14 is provided with a means to drive at least one of the conveyor belts 4 and 6. Drum 8 rotates about shaft 9, drum 10 rotates about shaft 11, drum 12 rotates about shaft 13 and drum 14 rotates about shaft 15. Shafts 9, 11 13 and 15 are supported by support member 16 which is illustrated as a plate. In order to provide a substantially uniform pressure to the extrudate along the area between the conveyor belts 4 and 6, a relatively rigid support plate 20 is provided beneath conveyor belt 6. Support plate 20 is a longitudinally elongated plate having two depending flanges 21 extending perpendicularly to the horizontal portion of plate 20 and parallel to the longitudinal axis of the conveyor which are supported by and rigidly affixed to a pair of elongated, transversely positioned plates 23 and 25. Flanges 21 are located at the longitudinal edges or sides of plate 20. As can be seen in FIGURE 2 and FIGURE 3, plate 23 is positioned on support member 22 (and plate 25 is positioned on support members 24). The height of plate 23 and thus the height of support plate 20 can be adjusted by adjustable bolts 50, 52, 54 and 56. An identical arrangement is provided for plate 25 and supports 24.

Figure 4:
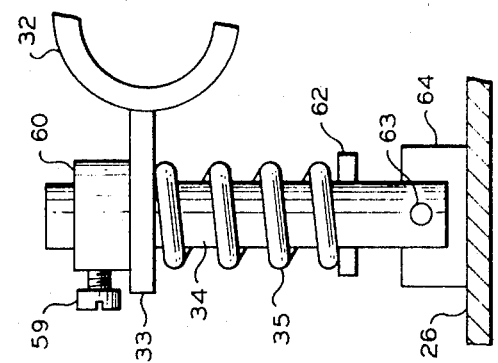
FIGURE 4 is a detail view of one of the mountings for the upper plate.

Upper support plate 26 which applies the uniform pressure along the length of the conveyor is spring loaded by springs 35 on shafts 34 and springs 31 on shafts 30. Shafts 34 pass upwardly through openings in flange 33 and are provided with adjustable stop means 60 on the upper end thereof above flange 33 to limit the downward movement of upper support plate 26. Stop means can be provided with any suitable securing means, for example a set screw 59. If desired, shoulder 62 can be separate from shaft 34 and movable along the length thereof to vary the spring bias. Flange 33 is rigidly connected to cylindrical support 32 which in turn is rigidly attached to support member 16. Similarly, shafts 30 pass through openings in flange 29 and are provided with stop means 61 while flange 29 is rigidly connected to cylindrical support 28 which in turn is attached to support member 16. The four spring-loaded shafts 30, 30, 34 and 34 maintain a substantially uniform pressure on plate 26. Plate 26 is provided with an upwardly extending flange 27 along each longitudinal side thereof. As exemplified by the illustration of one of the shafts 34 in FIGURE 4, each of shafts 34 and 30 can be provided with a shoulder 62, against which the lower end of spring 35 (or 31) abuts. Pin 63 passes through the lower end of shaft 34 (or 30) and through two adjacent lugs 64 fixed to plate 26 to pivotably secure the lower end of shaft 34 (or 30) to plate 26.

In order to prevent rotation of plate 26 about a longitudinal axis as might occur when the extrudate was not centered across the width of the belt, an anti-rotation means is provided. The anti-rotation means comprises a cylindrical shaft 38 which is rotatably attached to upwardly extending flange members 27 through pins 40 which are mounted in flanges 27. Welded onto shaft 38 is circular pipe 37 which has welded on the other end pipe 36. Shaft or pin 44 passes through pipe 36 and is secured to flanges 45 and 46 which depend from cylindrical support 28. Pipe 36 is rotatable on pin 44. Shaft 44 is parallel to the axis of rotation of shaft 38. In the presently preferred embodiment, shafts 38 and 44 are positioned perpendicularly to the longitudinal axis of the conveyor. The combination of shaft 38, pipe 37, shaft 36 and pin 44 attached as shown prevent the rotation of plate 26 about a longitudinal axis (i.e. along the line of movement of the extrudate 2) as might occur if the extrudate is off-center as shown, for exmple in FIGURE 3 as occurs during startup. However, the combination allows the plate to be moved up and down to adjust for different extrudate sizes and/or different pressures which are applied by the conveyor belts.

As can be seen from the drawing, the combination of the two plate support members provides a continuous uniform pressure along the length of the conveyor belts. The anti-rotation mechanism permits all portions of the width of the belt to be used during the course of the pulling operation without affecting the ability of the machine to grip the extrudate. In a presently preferred embodiment, plates 20 and 26 extend along a substantial portion of the conveyor.

Reasonable variation and modification are possible within the scope of the foregoing disclosure, the drawings, and the claims to the invention without departing from the spirit thereof.

I claim:
1. In an apparatus for conveying a pipe away from a source thereof, said apparatus comprising
a lower conveyor means;
an upper conveyor means superimposed over said lower conveyor means and in parallel relationship with said lower conveyor means;
means to drive at least one of said conveyor means; and
first planar support plate means for a first one of said conveyor means;
the improvement which comprises
means for rigidly mounting said first planar support plate means with respect to said first one of said conveyor means;
a second planar support plate means for the second one of said conveyor means, said second planar support plate means comprising a longitudinal plate extending along said second one of said conveyor means with two flange members extending perpendicular to said longitudinal plate away from said second one of said conveyor means, and parallel to the longitudinal axis of said second one of said conveyor means;
means to apply pressure to said second planar support plate means so that said pipe between said upper and lower conveyor means has applied to it a continuous uniform pressure along its length by said upper and lower conveyor means, said pressure applying means comprises a plurality of springs mounted on said second planar support plate means on the side thereof opposite the side facing said pipe and so placed as to evenly distribute pressure on said second planar support plate means; and
means to prevent rotation of said second planar support plate means about the longitudinal axis of said second one of said conveyor means, said means to prevent rotation of said second planar support plate means comprising a first member rotatably attached between said flange members, a shaft, means for positioning said shaft parallel to the axis of rotation of said first member, a second member attached at one end thereof to said first member, and a third member attached to another end of said second member and rotatably positioned on said shaft.

2. An apparatus according to claim 1 wherein said upper and lower conveyor means are endless belts, each supported by rotatable drums.

3. An apparatus according to claim 1 wherein said first and second planar support plate means coextend along a substantial portion of the upper and lower conveyor means.

References Cited
UNITED STATES PATENTS

| | | | |
|---|---|---|---|
| 1,743,018 | 1/1930 | Magnusson | 198—165 |
| 2,561,069 | 7/1951 | Peterson | 198—162 |

RICHARD E. AEGERTER, Primary Examiner